United States Patent
Bortoli et al.

(10) Patent No.: US 11,226,014 B2
(45) Date of Patent: Jan. 18, 2022

(54) HYDRAULIC CLUTCH ASSEMBLIES

(71) Applicant: Hamilton Sundstrand Corporation, Charlotte, NC (US)

(72) Inventors: Stephen Michael Bortoli, Roscoe, IL (US); Aaron M. Finke, Janesville, WI (US); Mark J. Franklin, Janesville, WI (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 117 days.

(21) Appl. No.: 16/388,254

(22) Filed: Apr. 18, 2019

(65) Prior Publication Data

US 2020/0332882 A1 Oct. 22, 2020

(51) Int. Cl.
| | |
|---|---|
| *F16D 25/0638* | (2006.01) |
| *F02C 7/36* | (2006.01) |
| *F16D 25/12* | (2006.01) |
| *F16H 57/04* | (2010.01) |
| *F16L 9/19* | (2006.01) |
| *F16D 48/02* | (2006.01) |

(52) U.S. Cl.
CPC ............ *F16D 25/0638* (2013.01); *F02C 7/36* (2013.01); *F16D 25/123* (2013.01); *F16H 57/043* (2013.01); *F16H 57/0426* (2013.01); *F16H 57/0457* (2013.01); *F16L 9/19* (2013.01); *F16D 48/0206* (2013.01); *F16D 2048/0209* (2013.01)

(58) Field of Classification Search
CPC .... F16D 25/0638; F16D 25/123; F16D 13/74; F16D 2300/06; F16D 48/0206; F16D 2048/0209; F16H 57/0426; F16H 57/043; F16H 57/0473; F16H 57/0457; F16L 9/19; F02C 7/36

USPC ............................................ 192/85.25, 85.61
See application file for complete search history.

(56) References Cited

U.S. PATENT DOCUMENTS

| | | | | |
|---|---|---|---|---|
| 3,823,802 | A | * | 7/1974 | Winzeler ............... F16D 25/123 |
| | | | | 192/106 F |
| 3,863,746 | A | * | 2/1975 | Schulz ............... F16D 25/0638 |
| | | | | 192/106 F |
| 6,810,772 | B2 | | 11/2004 | Hori et al. |

(Continued)

FOREIGN PATENT DOCUMENTS

| | | |
|---|---|---|
| CN | 107269743 A | 10/2017 |
| DE | 1052315 B | 3/1959 |

(Continued)

OTHER PUBLICATIONS

Extended European search report issued in corresponding EP application No. 19212094.7, dated Jun. 3, 2020.

*Primary Examiner* — Richard M Lorence
(74) *Attorney, Agent, or Firm* — Locke Lord LLP; Daniel J. Fiorello; Gabrielle L. Gelozin (57) ABSTRACT

A hydraulic clutch assembly can include a shaft defining a shaft channel, one or more hydraulic ports defined through the shaft, and one or more lubrication holes defined through the shaft. A porting manifold can be disposed at least partially within the shaft channel. The porting manifold can include a control pressure path in fluid communication with the one or more hydraulic ports and a lubrication flow path in fluid communication with the one or more lubrication holes. The control pressure path and the lubrication path can be fluidly isolated in the porting manifold.

16 Claims, 7 Drawing Sheets

(56) References Cited

U.S. PATENT DOCUMENTS

| | | |
|---|---|---|
| 6,840,363 B2 | 1/2005 | Braford, Jr. et al. |
| 8,840,505 B2 | 9/2014 | Frait |
| 9,453,540 B2 | 9/2016 | Agner et al. |
| 9,534,640 B2 | 1/2017 | Bouton et al. |
| 2011/0290361 A1* | 12/2011 | Anderson ............ F16L 27/087 138/114 |
| 2012/0217122 A1 | 8/2012 | Kasuya et al. |

FOREIGN PATENT DOCUMENTS

| | | |
|---|---|---|
| DE | 112012000729 T5 | 1/2014 |
| KR | 20130050398 A | 5/2013 |

\* cited by examiner

HYDRAULIC CLUTCH ASSEMBLIES

BACKGROUND

1. Field

This disclosure relates to transmission systems, e.g., for aircraft low speed spool turbomachines.

2. Description of Related Art

Moving engine accessories to the low speed spool requires a speed converting transmission to take a large speed ratio and turn it into a tighter speed ratio band. One method of doing this is the use of a shifting transmission consisting of clutches that selectively engage different gear ratios. These clutches need to be selectively open or closed such that they can transmit or not transmit torque on a command.

Such conventional methods and systems have generally been considered satisfactory for their intended purpose. However, there is still a need in the art for improved clutch assemblies. The present disclosure provides a solution for this need.

SUMMARY

A hydraulic clutch assembly can include a shaft defining a shaft channel, one or more hydraulic ports defined through the shaft, and one or more lubrication holes defined through the shaft. A porting manifold can be disposed at least partially within the shaft channel. The porting manifold can include a control pressure path in fluid communication with the one or more hydraulic ports and a lubrication flow path in fluid communication with the one or more lubrication holes. The control pressure path and the lubrication path can be fluidly isolated in the porting manifold.

The control pressure path can include a central axial channel defined partially along an axial length of the porting manifold from a control pressure inlet of the porting manifold, and one or more radial channels defined radially from the central axial channel to a respective control pressure outlet of the porting manifold. The shaft can include a control pressure annulus in fluid communication with the one or more control pressure outlets of the one or more radial channels. The one or more hydraulic ports can be in fluid communication with the control pressure annulus.

The lubrication flow path can include one or more axial lubrication channels defined at least partially along an axial length of the porting manifold from a lubrication flow inlet of the porting manifold, and one or more radial lubrication channels defined radially from a respective axial lubrication channel to a respective lubrication flow outlet of the porting manifold. The shaft can include a lubrication flow annulus in fluid communication with the one or more lubrication flow outlets of the one or more radial channels. One or more lubrication holes of the one or more lubrication holes can be in fluid communication with the lubrication flow annulus.

The porting manifold can include one or more drive tabs configured to limit insertion into the shaft. The porting manifold can include a plurality of seal grooves. The assembly can include a plurality of manifold seals disposed within the seal grooves and configured to fluidly isolate the control pressure from the lubrication flow within the shaft.

The assembly can include a backstop and a piston disposed on the shaft. The backstop can be fixed to the shaft and the piston can be slidably engaged to the shaft to move relative to the shaft and the backstop. The backstop and the piston can define a hydraulic cavity therebetween in fluid communication with the one or more hydraulic ports of the shaft. The piston can be configured to move between a retracted position and an engaged position wherein the piston engages a clutch pack. The piston can be slidably sealed to an outer diameter of the backstop.

The assembly can include a balance dam fixed to the piston and disposed around a portion of the backstop to define a lubrication cavity between a back side of the backstop and the balance dam. A spring can be disposed between the back side of the backstop and the balance dam to bias the piston to the retracted position. At least one lubrication hole of the one or more lubrication holes can be defined through the shaft and through the backstop to fluidly communicate with the lubrication cavity.

The assembly can include an inner clutch basket rotationally fixed to the shaft to turn with the shaft, an outer clutch basket rotatably mounted on the shaft to rotate relative to the shaft, and a clutch pack disposed between the inner clutch basket and the outer clutch basket. The clutch pack can be configured to be compressed by the piston in the engaged position to engage the inner clutch basket to the outer clutch basket to cause the outer clutch basket to rotate with the inner clutch basket and the shaft.

In accordance with at least one aspect of this disclosure, a porting manifold can be configured to be at least partially disposed within a shaft channel of a transmission shaft. The porting manifold can include any embodiment of a manifold disclosed herein (e.g., as described above). For example, the manifold can include a control pressure path configured to be in fluid communication with one or more hydraulic ports of the shaft, and a lubrication flow path configured to be fluid communication with one or more lubrication holes of the shaft. The control pressure path and the lubrication path can be fluidly isolated in the porting manifold.

In accordance with at least one aspect of this disclosure, a method can include providing a hydraulic control pressure through a shaft of a transmission to control a position of a piston of a clutch assembly to selectively engage a clutch pack of the clutch assembly. The method can include providing a lubrication flow fluidly isolated from the control pressure through the shaft. The method can include any other suitable method and/or portion thereof.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
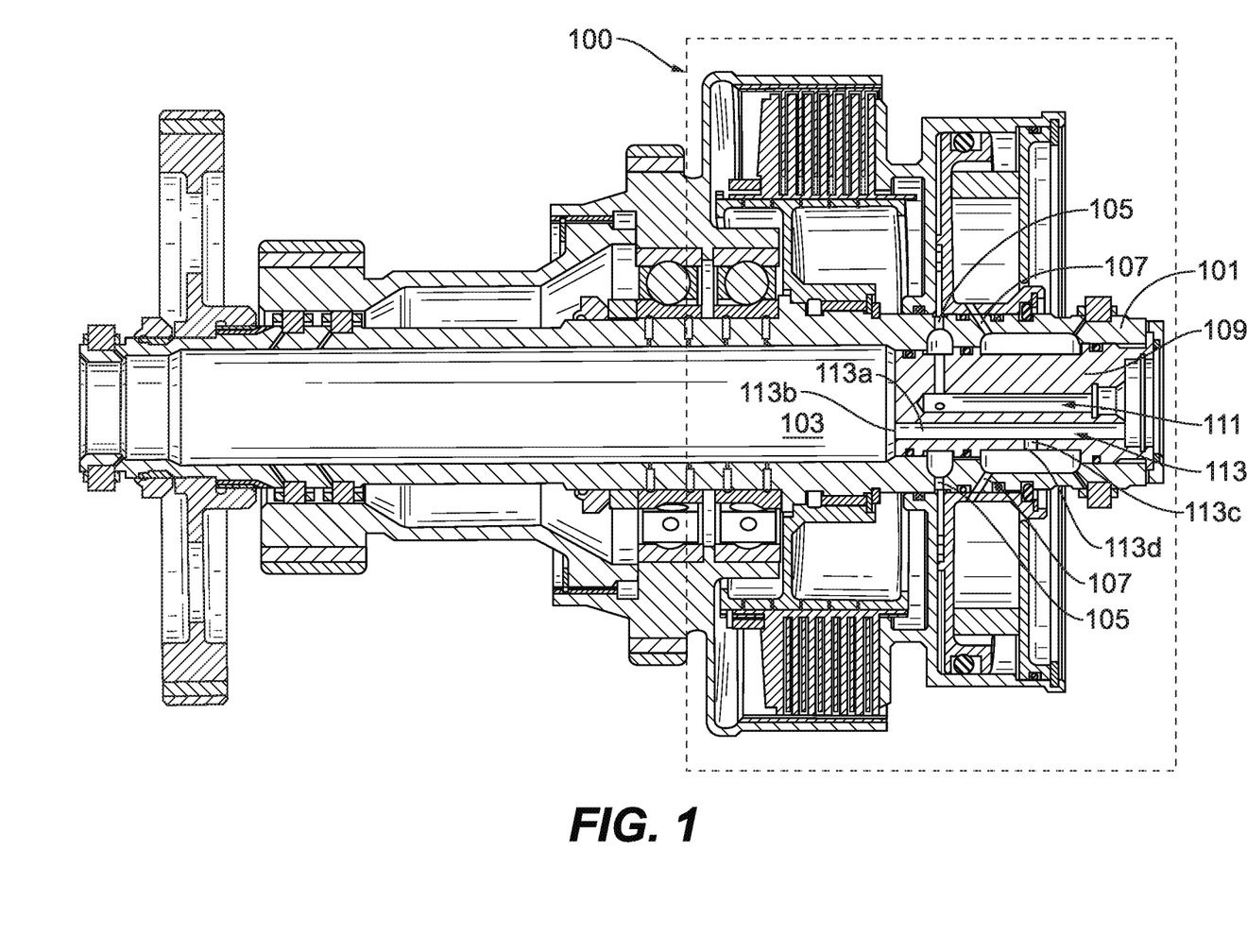
FIG. 1 is a cross-sectional view of an embodiment of a clutch assembly disposed on an embodiment of a shaft in accordance with this disclosure.

Reference will now be made to the drawings wherein like reference numerals identify similar structural features or aspects of the subject disclosure. For purposes of explanation and illustration, and not limitation, an illustrative view of an embodiment of a hydraulic clutch assembly in accordance with the disclosure is shown in FIG. 1 and is designated generally by reference character 100. Other embodiments and/or aspects of this disclosure are shown in FIGS. 2-9.

Referring to FIGS. 1-9 generally, a hydraulic clutch assembly 100 can include a shaft 101 defining a shaft channel 103, one or more hydraulic ports 105 defined through the shaft 101, and one or more lubrication holes 107 defined through the shaft 101. Any other suitable holes and/or construction is contemplated herein.

As shown in FIG. 1, a porting manifold 109 can be disposed at least partially within the shaft channel 103. The porting manifold 109 can include a control pressure path 111 in fluid communication with the one or more hydraulic ports 105 and a lubrication flow path 113 in fluid communication with the one or more lubrication holes 107. As shown, the control pressure path 111 and the lubrication path 113 can be fluidly isolated in the porting manifold 109.

Figure 2:
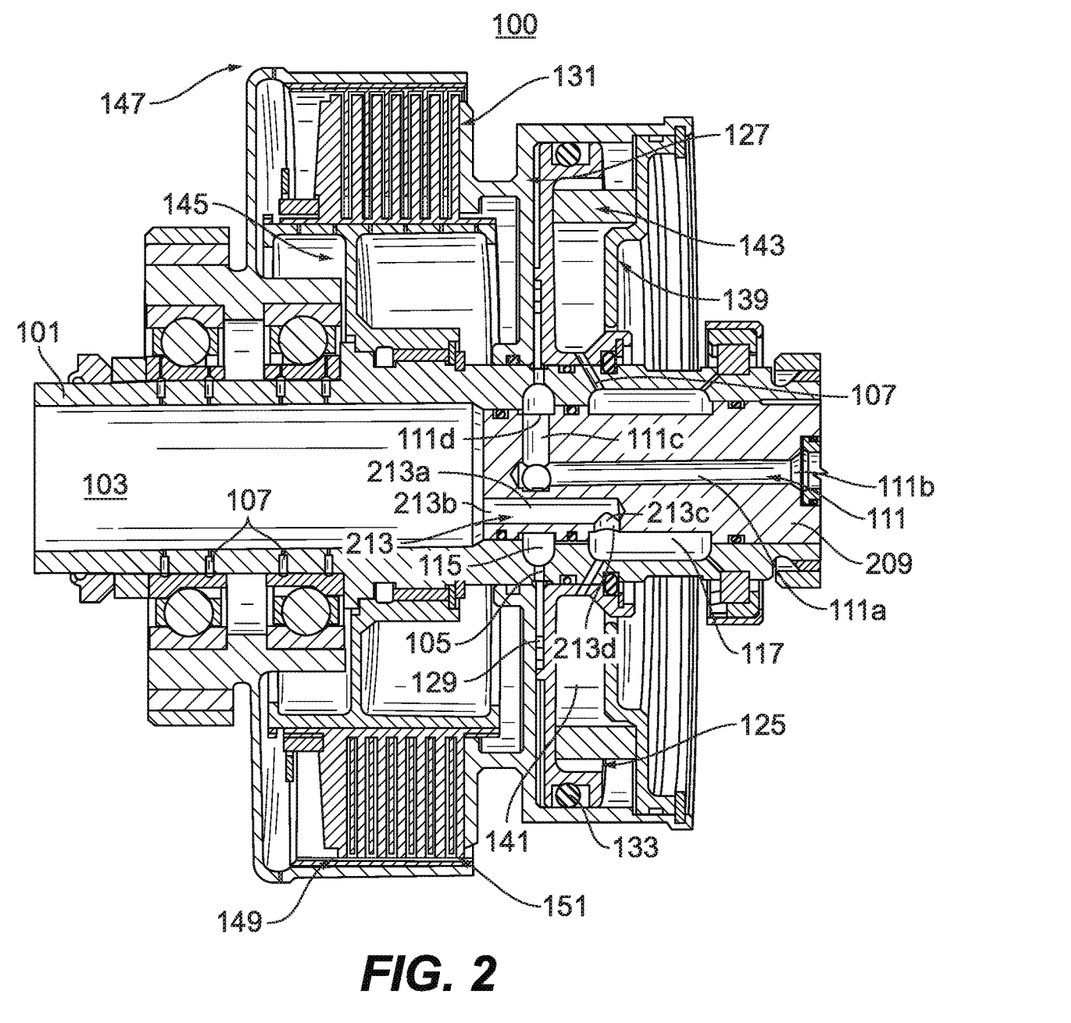
FIG. 2 is a partial cross-sectional view of the clutch assembly of FIG. 1, shown having another embodiment of a porting manifold in accordance with this disclosure.

FIG. 2 shows another embodiment of a porting manifold 209 that is similar to manifold 109, except that the lubrication flow path 213 does not pas all the way through the manifold 213 (e.g., such an embodiment can be fed lubrication oil from the shaft, left of the manifold as shown). Any other suitable paths and/or arrangement thereof are contemplated herein.

Figure 3:
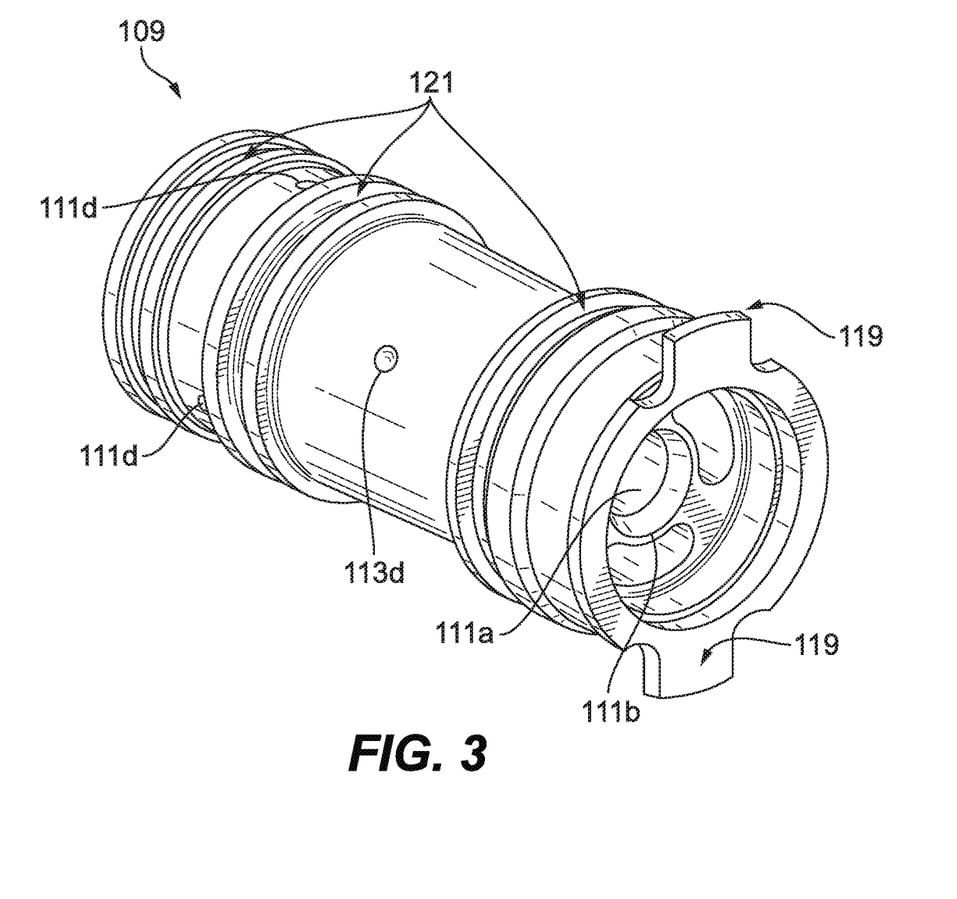
FIG. 3 is a perspective view of the embodiment of the porting manifold shown in FIG. 1.
Figure 4:
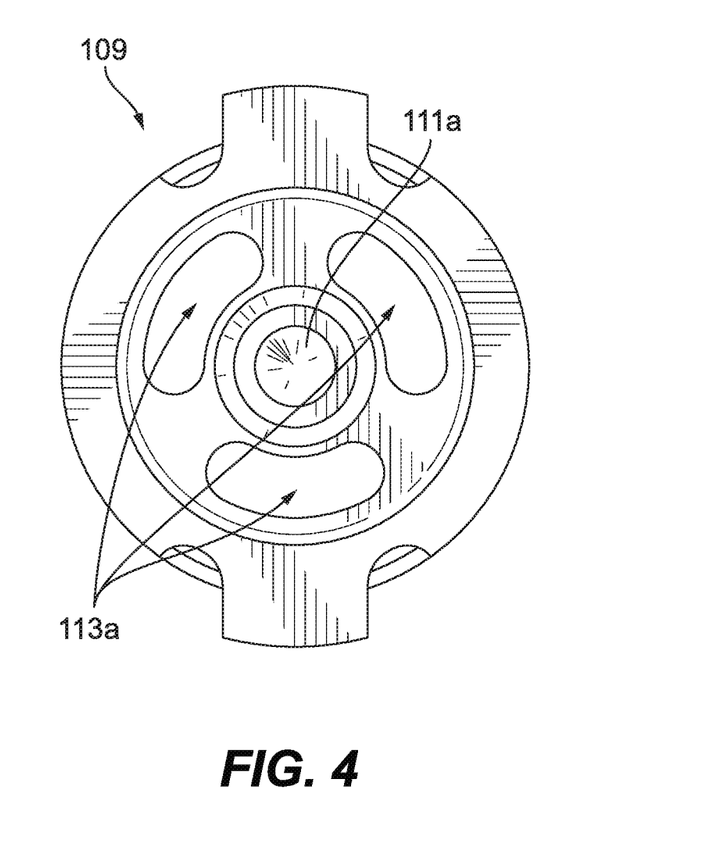
FIG. 4 is a plan view of the embodiment of FIG. 3.

Referring additionally to FIGS. 3 and 4, the control pressure path 111 can include a central axial channel 111a defined partially along an axial length of the porting manifold 109, 209 from a control pressure inlet 111b of the porting manifold 109, 209. The control pressure path 111 can include one or more radial channels 111c defined radially from the central axial channel 111a to a respective control pressure outlet 111d of the porting manifold 109, 209. The shaft 101 can include a control pressure annulus 115 in fluid communication with the one or more control pressure outlets 111d of the one or more radial channels 111c. The one or more hydraulic ports 105 can be in fluid communication with the control pressure annulus 115.

The lubrication flow path 113, 213 can include one or more axial lubrication channels 113a, 213a defined at least partially along an axial length of the porting manifold 109, 209 from a lubrication flow inlet 113b, 213b of the porting manifold 109, 209. The lubrication flow path 113, 213 can include one or more radial lubrication channels 113c, 213c defined radially from a respective axial lubrication channel 113a, 213a to a respective lubrication flow outlet 113d, 213d of the porting manifold 109, 209. The shaft 101 can include a lubrication flow annulus 117 in fluid communication with the one or more lubrication flow outlets 113d, 213d of the one or more radial channels 213c. One or more lubrication holes 107 of the one or more lubrication holes can be in fluid communication with the lubrication flow annulus 117.

Figure 5:
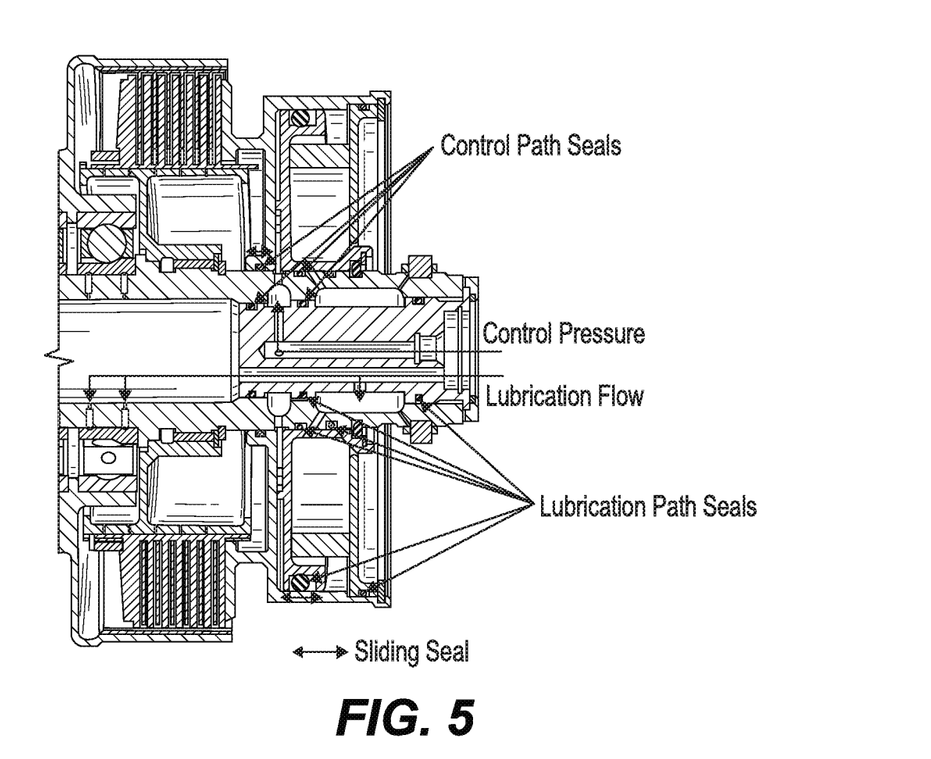
FIG. 5 is a cross-sectional view of the embodiment of FIG. 1, showing flow lines of control pressure and lubrication flow through the porting manifold of FIGS. 3 and 4.
Figure 6:
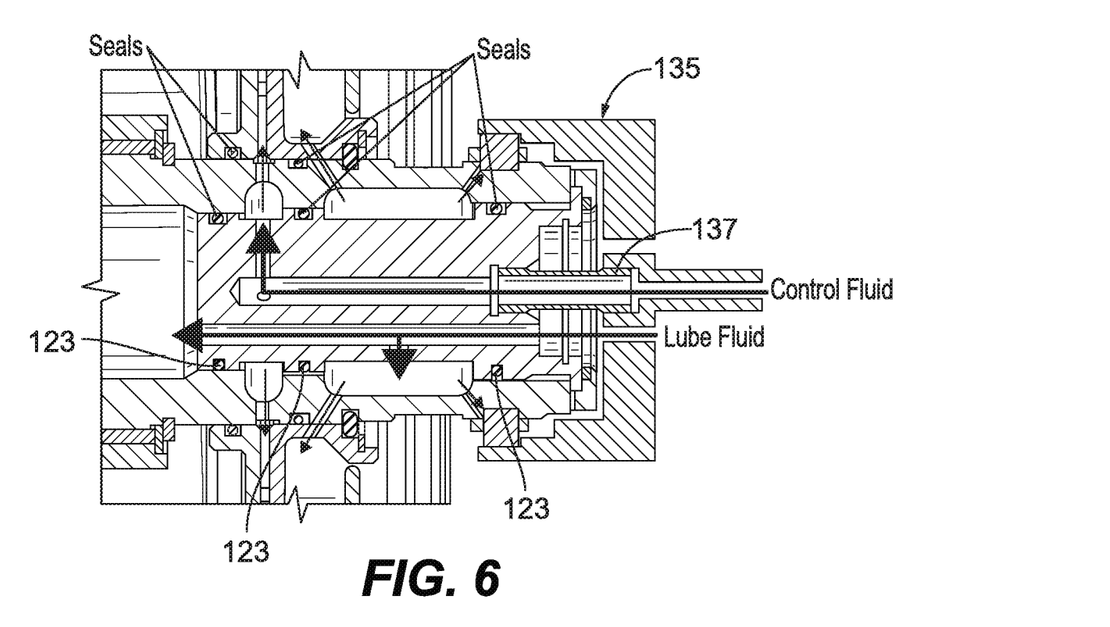
FIG. 6 is a partial cross-sectional view of the embodiment of FIG. 5, showing a housing attached to the shaft for fluidly isolating the control pressure flow path from the lubrication flow path.

The porting manifold 109, 209 can include one or more drive tabs 119 configured to limit insertion into the shaft 101, for example, and/or to connect the manifold 109, 209 to the shaft 101. The porting manifold 109, 209 can include a plurality of seal grooves 121. Referring additionally to FIGS. 5 and 6, the assembly 100 can include a plurality of manifold seals 123 disposed within the seal grooves 121 and configured to fluidly isolate the control pressure from the lubrication flow within the shaft 101. The assembly 100 can include any other suitable seals to isolate lubrication flow and control pressure (e.g., as shown in FIG. 5).

The assembly 100 can include a backstop 125 and a piston 127 disposed on the shaft 101. The backstop 125 can be fixed to the shaft 101 and the piston 127 can be slidably engaged to the shaft 101 to move relative to the shaft 101 and the backstop 125. The backstop 125 and the piston 127 can define a hydraulic cavity 129 therebetween in fluid communication with the one or more hydraulic ports 105 of the shaft 101.

As shown in FIG. 6, the assembly 100 can include a housing 135 configured to provide separate connections for the control pressure path 111 and the lubrication flow path 113. Any other suitable components are contemplated herein (e.g., a stem 137 as shown for connecting to the housing 135).

Figure 7:
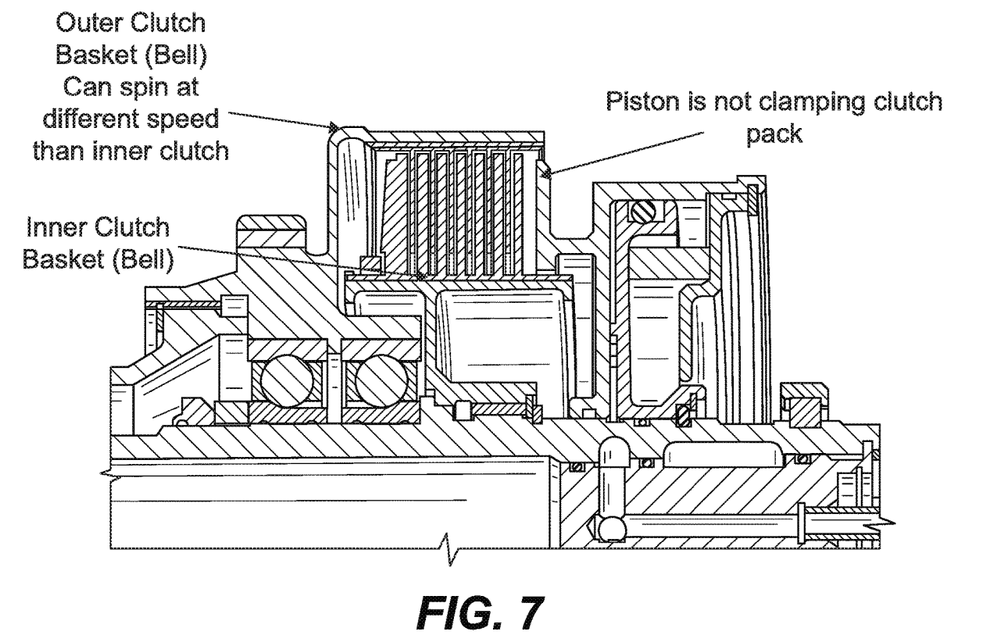
FIG. 7 is a partial cross-sectional view of an embodiment in accordance with this disclosure, shown in a retracted position where sufficient control pressure is not applied to the hydraulic cavity to overcome the bias of the spring.
Figure 8:
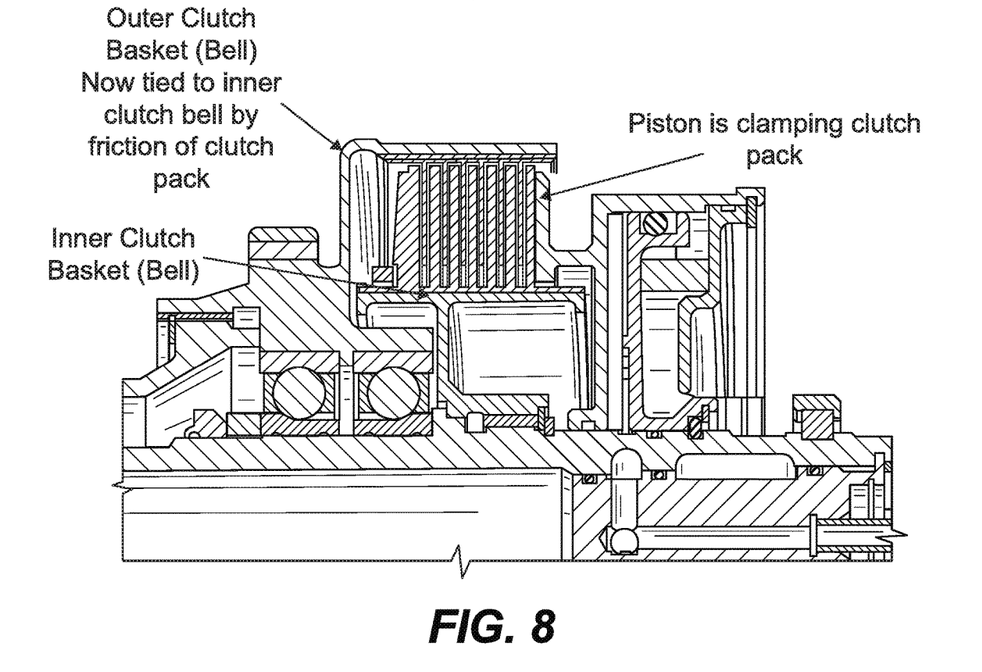
FIG. 8 is a partial cross-sectional view of an embodiment in accordance with this disclosure, shown in an engaged state where sufficient control pressure is applied to the hydraulic cavity to overcome the bias of the spring and to compress the clutch pack.

Referring to FIGS. 2, 7, and 8, the piston 127 can be configured to move between a retracted position (e.g., as shown in FIG. 7) and an engaged position (e.g., as shown in FIG. 8) wherein the piston 127 engages a clutch pack 131. As shown, the piston 127 can be slidably sealed to an outer diameter of the backstop 125 (e.g., via sliding seal 133).

The assembly 100 can include a balance dam 139 fixed to the piston 127 and disposed around a portion of the backstop 125 to define a lubrication cavity 141 between a back side of the backstop 125 and the balance dam 139. A spring 143 can be disposed between the back side of the backstop 125 and the balance dam 139 to bias the piston 127 to the retracted position. The spring 143 can be any suitable biasing member (e.g., a coil spring, a wavy washer spring). The spring 143 can push on the backstop 125 and the pressure dam 139 with any suitable force configured to be overcome by a suitable control pressure in the hydraulic cavity 129.

At least one lubrication hole 107 of the one or more lubrication holes 107 can be defined through the shaft 101 and through the backstop 125 to fluidly communicate with the lubrication cavity 141. The lubrication flow can be ported to the cavity 141 because control pressure can be intermittent and lubrication flow can be constant to prevent movement of the piston 127 toward the engaged position. Any other suitable lubrication holes are contemplated herein.

The assembly 100 can include an inner clutch basket 145 rotationally fixed to the shaft 101 to turn with the shaft 101. The assembly 100 can include an outer clutch basket 147 rotatably mounted on the shaft 101 to rotate relative to the shaft 101. The assembly 100 can include a clutch pack 131 disposed between the inner clutch basket 145 and the outer clutch basket 147. The clutch pack 131 can be configured to be compressed by the piston 131 in the engaged position (e.g., as shown in FIG. 8) to engage the inner clutch basket 145 to the outer clutch basket 147 to cause the outer clutch basket 147 to rotate with the inner clutch basket 145 and the shaft 100.

The clutch pack 131 can include a plurality of separator discs 149 slidably connected to the inner clutch basket 145 and a plurality of friction discs 151 connected to the outer clutch basket 147. The separator discs 149 can be pressed by the piston 127 to slide and contact the friction discs 151 to engage the separator discus 149 to the friction discs 151. It is contemplated that the friction discs 151 can be connected to the outer clutch basket 147 and the separator discs 149 can be connected to the inner clutch basket 145. Any other suitable arrangement and/or clutch pack type is contemplated herein.

The control pressure fluid and/or the lubrication fluid can be an oil, for example. Any other suitable fluid (e.g., hydraulic fluid) is contemplated herein.

In accordance with at least one aspect of this disclosure, a porting manifold, e.g., 109, 209 can be configured to be at least partially disposed within a shaft channel of a transmission shaft. The porting manifold can include any embodiment of a manifold disclosed herein (e.g., as described above). For example, the manifold can include a control pressure path configured to be in fluid communication with one or more hydraulic ports of the shaft, and a lubrication flow path configured to be fluid communication with one or more lubrication holes of the shaft. The control pressure path and the lubrication path can be fluidly isolated in the porting manifold.

Figure 9:
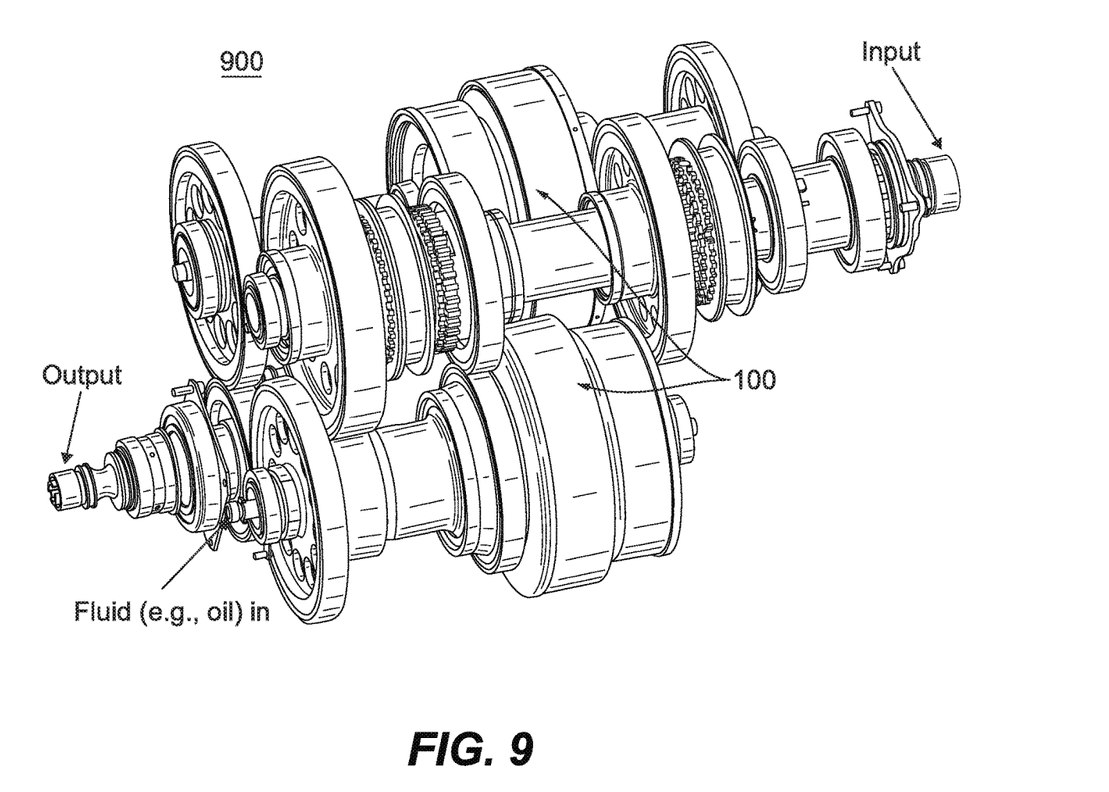
FIG. 9 is a perspective view of an embodiment of a transmission having an embodiment of a clutch assembly in accordance with this disclosure.

Referring additionally to FIG. 9, any suitable embodiment of an assembly, e.g., 100 can be utilized in a transmission 900. For example, transmission 900 can be attached to a low spool of a turbomachine engine. The transmission 900 can include any suitable number of stages (e.g., 4 stages as shown).

In accordance with at least one aspect of this disclosure, a method can include providing a hydraulic control pressure through a shaft of a transmission to control a position of a piston of a clutch assembly to selectively engage a clutch pack of the clutch assembly. The method can include providing a lubrication flow fluidly isolated from the control pressure through the shaft. The method can include any other suitable method and/or portion thereof.

In certain embodiments, when control pressure is low (e.g., less than the lubrication flow pressure), the clutch can be open and the outer clutch basket and inner clutch basket can rotate at different speeds. In certain embodiments, when control pressure is high (e.g., above lubrication flow pressure), the clutch can be closed and the outer clutch basket and inner clutch basket rotate at the same speed. Torque is then transmitted between the inner and outer clutch baskets.

Embodiments can utilize a clutch/piston arrangement in a low spool transmission on a jet engine accessory drive. Embodiments use hydraulic power to clamp and unclamp a clutch pack which selectively transmits torque between the inner and outer clutch bell. In certain embodiments, a piston return spring and a centrifugal pressure balance disc/dam ensures predictable operation across a wide operating speed band.

Embodiments include a suitable rotating clutch seal arrangement. Because control pressure and lubrication flow must be directed to the appropriate locations for proper operation, seals can be used to isolate the flow paths needed for proper clutch operation and to prevent unwanted leakage. As disclosed above, embodiments of a seal arrangement isolate two paths of flow/pressure. Embodiments allow for the movement of the clutch piston while sealing.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

Any suitable combination(s) of any disclosed embodiments and/or any suitable portion(s) thereof are contemplated herein as appreciated by those having ordinary skill in the art.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A hydraulic clutch assembly, comprising:
a shaft defining a shaft channel, one or more hydraulic ports defined through the shaft, and one or more lubrication holes defined through the shaft;
a porting manifold disposed at least partially within the shaft channel, wherein the porting manifold includes a control pressure path in fluid communication with the one or more hydraulic ports and a lubrication flow path in fluid communication with the one or more lubrication holes, wherein the control pressure path and the lubrication path are fluidly isolated in the porting manifold;
a backstop and a piston disposed on the shaft, wherein the backstop is fixed to the shaft, wherein the piston is slidably engaged to the shaft to move relative to the shaft and the backstop, wherein the backstop and the piston define a hydraulic cavity therebetween in fluid communication with the one or more hydraulic ports of the shaft, wherein the piston is configured to move between a retracted position and an engaged position wherein the piston engages a clutch pack, wherein the piston is slidably sealed to an outer diameter of the backstop; and
a balance dam fixed to the piston and disposed around a portion of the backstop to define a lubrication cavity between a back side of the backstop and the balance dam.

2. The assembly of claim 1, wherein the control pressure path includes:
a central axial channel defined partially along an axial length of the porting manifold from a control pressure inlet of the porting manifold; and
one or more radial channels defined radially from the central axial channel to a respective control pressure outlet of the porting manifold.

3. The assembly of claim 2, wherein the control pressure path includes shaft includes a control pressure annulus in fluid communication with the one or more control pressure outlets of the one or more radial channels, wherein the one or more hydraulic ports are in fluid communication with the control pressure annulus.

4. The assembly of claim 1, wherein the lubrication flow path includes:
   one or more axial lubrication channels defined at least partially along an axial length of the porting manifold from a lubrication flow inlet of the porting manifold; and
   one or more radial lubrication channels defined radially from a respective axial lubrication channel to a respective lubrication flow outlet of the porting manifold.

5. The assembly of claim 4, wherein the shaft includes a lubrication flow annulus in fluid communication with the one or more lubrication flow outlets of the one or more radial channels, wherein, one or more lubrication holes of the one or more lubrication holes are in fluid communication with the lubrication flow annulus.

6. The assembly of claim 1, wherein the porting manifold includes one or more drive tabs configured to limit insertion into the shaft.

7. The assembly of claim 1, wherein the porting manifold includes a plurality of seal grooves, wherein the assembly further comprising a plurality of manifold seals disposed within the seal grooves and configured to fluidly isolate the control pressure from the lubrication flow within the shaft.

8. The assembly of claim 1, further comprising a spring disposed between the back side of the backstop and the balance dam to bias the piston to the retracted position.

9. The assembly of claim 8, wherein at least one lubrication hole of the one or more lubrication holes is defined through the shaft and through the backstop to fluidly communicate with the lubrication cavity.

10. The assembly of claim 1, further comprising an inner clutch basket rotationally fixed to the shaft to turn with the shaft, an outer clutch basket rotatably mounted on the shaft to rotate relative to the shaft, and a clutch pack disposed between the inner clutch basket and the outer clutch basket configured to be compressed by the piston in the engaged position to engage the inner clutch basket to the outer clutch basket to cause the outer clutch basket to rotate with the inner clutch basket and the shaft.

11. A porting manifold configured to be at least partially disposed within a shaft channel of a transmission shaft, comprising
   a control pressure path configured to be in fluid communication with one or more hydraulic ports of the shaft; and
   a lubrication flow path configured to be fluid communication with one or more lubrication holes of the shaft, wherein the control pressure path and the lubrication path are fluidly isolated in the porting manifold, wherein the one or more hydraulic ports of the shaft are in fluid communication with a hydraulic cavity defined between a backstop and a piston, and wherein the lubrication flow path is in fluid communication with a lubrication cavity between a back side of the backstop and a balance dam.

12. The manifold of claim 11, wherein the control pressure path includes:
   a central axial channel defined partially along an axial length of the porting manifold from a control pressure inlet of the porting manifold; and
   one or more radial channels defined radially from the central axial channel to a respective control pressure outlet of the porting manifold.

13. The manifold of claim 12, wherein the control pressure path includes a control pressure annulus in fluid communication with the one or more control pressure outlets of the one or more radial channels, wherein the one or more hydraulic ports are in fluid communication with the control pressure annulus.

14. The manifold of claim 11, wherein the lubrication flow path includes:
   one or more axial lubrication channels defined at least partially along an axial length of the porting manifold from a lubrication flow inlet of the porting manifold; and
   one or more radial lubrication channels defined radially from a respective axial lubrication channel to a respective lubrication flow outlet of the porting manifold.

15. The manifold of claim 14, wherein the shaft includes a lubrication flow annulus in fluid communication with the one or more lubrication flow outlets of the one or more radial channels, wherein, one or more lubrication holes of the one or more lubrication holes are in fluid communication with the lubrication flow annulus.

16. A hydraulic clutch assembly, comprising:
   a shaft defining a shaft channel, one or more hydraulic ports defined through the shaft, and one or more lubrication holes defined through the shaft;
   a porting manifold disposed at least partially within the shaft channel, wherein the porting manifold includes a control pressure path in fluid communication with the one or more hydraulic ports and a lubrication flow path in fluid communication with the one or more lubrication holes, wherein the control pressure path and the lubrication path are fluidly isolated in the porting manifold;
   a backstop and a piston disposed on the shaft, wherein the backstop is fixed to the shaft, wherein the piston is slidably engaged to the shaft to move relative to the shaft and the backstop, wherein the backstop and the piston define a hydraulic cavity therebetween in fluid communication with the one or more hydraulic ports of the shaft, wherein the piston is configured to move between a retracted position and an engaged position wherein the piston engages a clutch pack, wherein the piston is slidably sealed to an outer diameter of the backstop; and
   an inner clutch basket rotationally fixed to the shaft to turn with the shaft, an outer clutch basket rotatably mounted on the shaft to rotate relative to the shaft, wherein the clutch pack is disposed between the inner clutch basket and the outer clutch basket configured to be compressed by the piston in the engaged position to engage the inner clutch basket to the outer clutch basket to cause the outer clutch basket to rotate with the inner clutch basket and the shaft.

* * * * *